(12) United States Patent
Griffin

(10) Patent No.: US 9,027,702 B2
(45) Date of Patent: May 12, 2015

(54) SYNTHETIC JET MUFFLER

(71) Applicant: The Boeing Company, Seal Beach, CA (US)

(72) Inventor: Steven F. Griffin, Kihei, HI (US)

(73) Assignee: The Boeing Company, Chicago, IL (US)

( * ) Notice: Subject to any disclaimer, the term of this patent is extended or adjusted under 35 U.S.C. 154(b) by 93 days.

(21) Appl. No.: 14/055,560

(22) Filed: Oct. 16, 2013

(65) Prior Publication Data

US 2015/0101886 A1    Apr. 16, 2015

(51) Int. Cl.
| | | |
|---|---|---|
| B64C 21/08 | (2006.01) | |
| B64C 21/04 | (2006.01) | |
| F04D 29/68 | (2006.01) | |
| F01N 1/06 | (2006.01) | |
| G10K 11/175 | (2006.01) | |
| F01N 1/02 | (2006.01) | |
| B64C 21/00 | (2006.01) | |
| F04D 29/66 | (2006.01) | |
| F01N 1/00 | (2006.01) | |
| G10K 11/16 | (2006.01) | |

(52) U.S. Cl.
CPC ........................................ *F01N 1/02* (2013.01)

(58) Field of Classification Search
USPC ............... 181/269, 265, 206, 205, 267, 200; 244/130, 204, 207; 415/119, 914
See application file for complete search history.

(56) References Cited

U.S. PATENT DOCUMENTS

| | | | | |
|---|---|---|---|---|
| 3,948,348 A | * | 4/1976 | Bychinsky | .................... 181/206 |
| 3,948,349 A | * | 4/1976 | Bychinsky | .................... 181/206 |
| 4,648,807 A | * | 3/1987 | Tippetts et al. | ............ 417/413.2 |
| 5,938,404 A | | 8/1999 | Domzalski et al. | |
| 6,471,477 B2 | * | 10/2002 | Hassan et al. | ................. 416/90 A |
| 6,796,859 B1 | * | 9/2004 | Justen et al. | ................. 440/88 A |
| 8,006,917 B2 | * | 8/2011 | Arik et al. | .................. 239/102.2 |
| 8,033,324 B2 | * | 10/2011 | Mukasa et al. | ............... 165/80.3 |
| 8,069,910 B2 | * | 12/2011 | Beltran et al. | ................. 165/121 |
| 8,081,454 B2 | * | 12/2011 | Ishikawa et al. | .............. 361/694 |
| 8,122,732 B2 | * | 2/2012 | Lee et al. | ......................... 62/296 |
| 2010/0018675 A1 | * | 1/2010 | Aarts et al. | ............... 165/104.19 |
| 2011/0030928 A1 | * | 2/2011 | Bleiweiss | .................. 165/109.1 |
| 2014/0049970 A1 | * | 2/2014 | de Bock et al. | ............... 362/373 |

OTHER PUBLICATIONS

Hallez, Raphael F., Investigation of the Herschel-Quincke Tube Concept as a Noise Control Device for Turbofan Engines, Thesis submitted to the Faculty of the Virginia Polytechnic Institute and State University, Jan. 29, 2001, Blacksburg, Virginia, pp. iii-xi and 1-131.
Smith, et al., A Comparison between synthetic jets and continuous jets, Experiments in Fluids 34, 2003, pp. 467-472.
You, et al., Study of flow separation over an airfoil with synthetic jet control using large-eddy simulation, Center for Turbulence Research, Annual Research Briefs 2007, pp. 311-321.

* cited by examiner

*Primary Examiner* — Edgardo San Martin
(74) *Attorney, Agent, or Firm* — Perman & Green, LLP

(57) ABSTRACT

A synthetic jet muffler includes an exit end, a propagation path for conducting a first sound wave emitted by a synthetic jet generator to the exit end, and a shroud for conducting a second sound wave emitted from the synthetic jet generator in a direction opposite to the first sound wave to the exit end, wherein the shroud is disposed so that the first and second sound waves travel different distances to effect noise cancellation at the exit end.

18 Claims, 7 Drawing Sheets

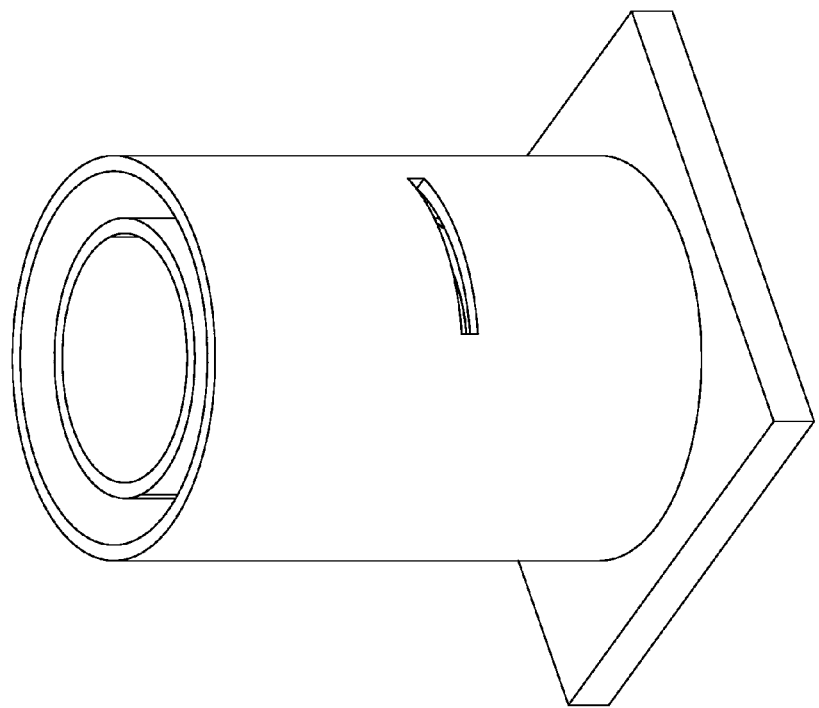
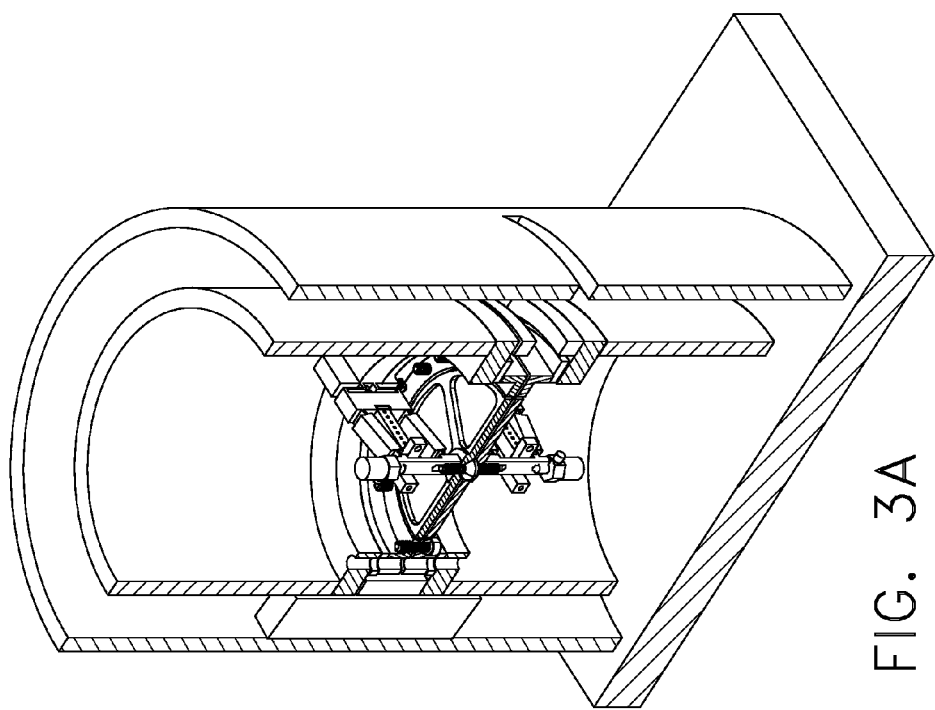
FIG. 3B
FIG. 3A

SYNTHETIC JET MUFFLER

BACKGROUND

1. Field

The exemplary embodiments generally relate to synthetic jets and, more particularly, to canceling sound emanating from synthetic jet generators.

2. Brief Description of Related Developments

A synthetic jet generator typically includes a volume with one or more apertures. The volume is generally pumped at a single frequency in the audible range, to force air in and out of the one or more apertures to form a synthetic jet. While producing an effective synthetic jet, the reciprocating, single frequency action of the pumping mechanism of the synthetic jet generator generally produces high sound levels at the drive frequency. High sound levels may also be produced by the resulting synthetic jet, however, in practical applications, the synthetic jet produces noise outside of a supporting structure, while the pumping mechanism produces noise inside the structure.

Traditional methods of increasing sound attenuation typically include passive treatments, for example, adding mass or dampening materials. However, adding mass may generally decrease performance, in particular for in flight applications. Furthermore, because acoustic propagation paths are difficult to analyze, passive treatments are generally applied conservatively, resulting in adding more mass than required.

It would be advantageous to provide a device for cancelling noise caused by the pumping action of a synthetic jet generator without adding excessive treatments.

BRIEF DESCRIPTION OF THE DRAWINGS

FIGS. 3A and 3B show a cross sectional and an isometric view of an exemplary synthetic jet muffler in accordance with aspects of the disclosed embodiment;

DETAILED DESCRIPTION

Figure 1:
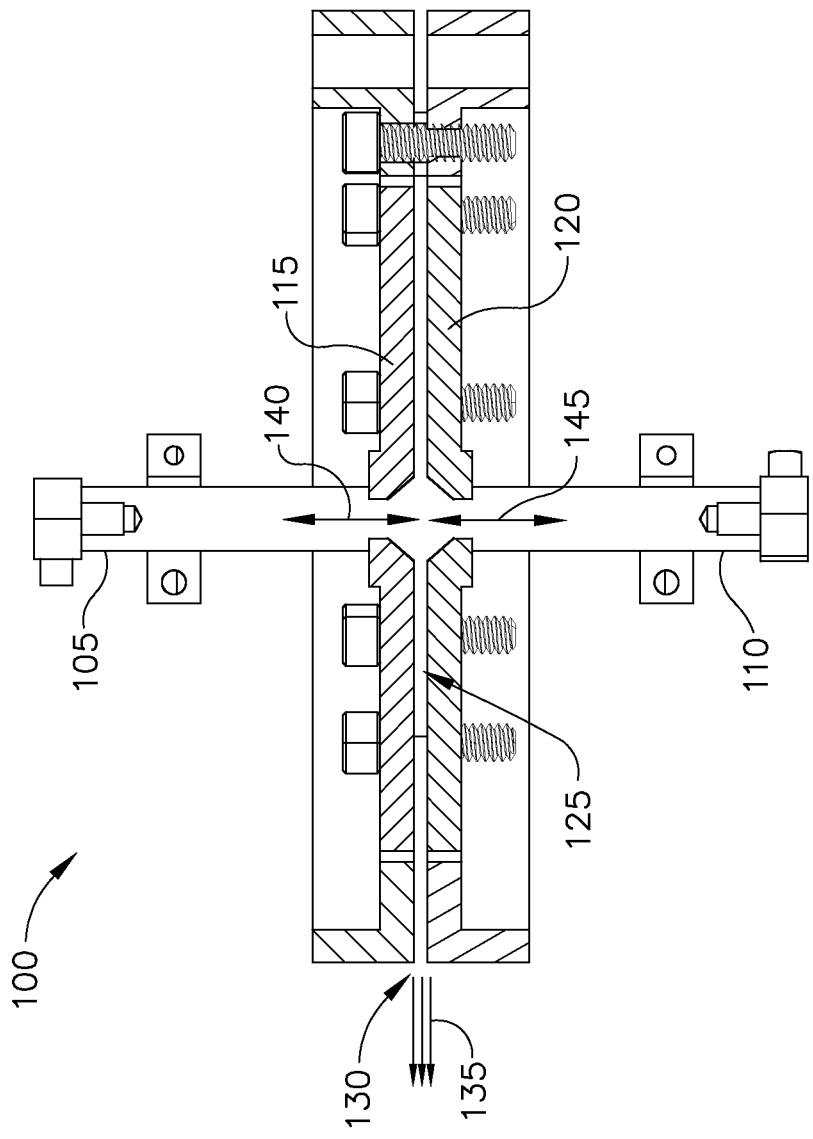
FIG. 1 shows a schematic illustration of a cross section of an exemplary synthetic jet generator in accordance with aspects of the disclosed embodiment.
Figure 1A:
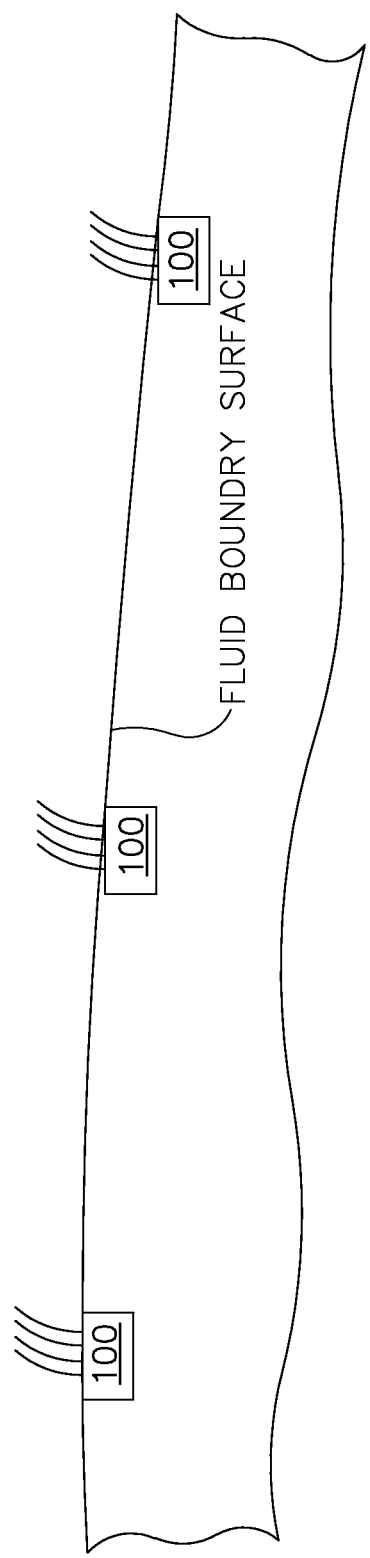
FIG. 1A shows exemplary synthetic jets integrated onto or with a suitable fluid boundary surface in accordance with aspects of the disclosed embodiment.

FIG. 1 shows an exemplary jet or jet generator 100 for use with the disclosed embodiment. Unless otherwise noted, the tem jet may be used alternately to refer to the jet generator or the jet flow effected by the jet generator. The exemplary jet generator 100 may operate by moving a fluid back and forth through an opening or aperture. A synthetic jet flow may be produced by the cyclic suction and expulsion of the fluid from a cavity through the opening by a piston or diaphragm. The exemplary jet generator 100 may include actuators 105, 110, which may include respectively coupled pistons 115 and 120, at least one cavity defining a volume 125, and at least one aperture 130. In the exemplary embodiment illustrated in FIG. 1, the jet 100 is shown for clarity and descriptive purposes without surrounding structures or surfaces to which the jet may be mounted or interfaced. As may be realized, however, the synthetic jet (or any number thereof) may be integrated as desired on to or with suitable fluid boundary surfaces as shown, for example, in FIG. 1A.

The actuators 105, 110 may comprise one or more piezoelectric, electrostrictive, or electromagnet elements. The pistons 115, 120 may each comprise a rigid body or may be flexible and periodically bowed, bent, or otherwise deformed to change the volume 125 of the cavity. The pumping action of pistons 115 and 120 generates a synthetic jet 135 by cyclically pulling in and expelling a fluid, for example, air, through the aperture 130. Arrows 140, 145 show the pumping direction of pistons 115 and 120, respectively. The pistons 115, 120 are each moving away and toward the volume in a synchronized fashion and thus are effective at radiating sound external to the synthetic jet generator 100. In this exemplary embodiment, the jet is provided by the pistons 115, 120 which may be considered to represent a sound point source formed by the synchronous pumping action. It should be understood that while the cyclic suction and expulsion are described herein as being achieved using actuators and pistons, any suitable mechanism using any suitable technique may be used to effect the actions of the generator for generating a synthetic jet.

Figure 2:
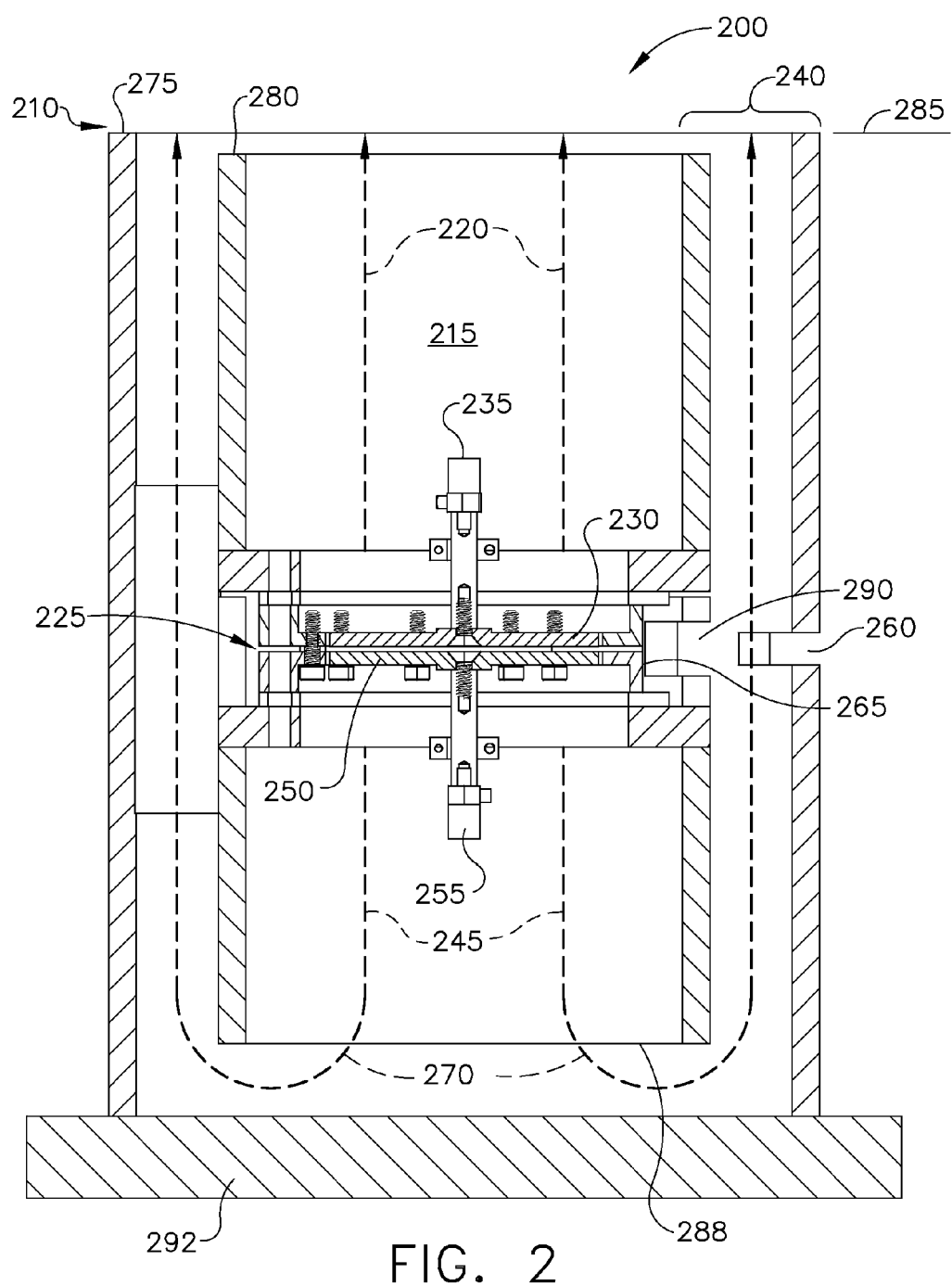
FIG. 2 shows a diagram of an exemplary synthetic jet muffler in accordance with aspects of the disclosed embodiment.

In at least one aspect of the disclosed embodiment, a waveguide structure that introduces a phase difference of approximately 180 degrees in the sound waves radiating from the jet (such as from each of the pistons 115, 120) may be used to substantially cancel the noise from the pistons. The jet may be operated at a substantially fixed frequency, and may use a structure with dimensions determined from the operating frequency to effect the noise cancellation. FIG. 2 depicts a cross section of an exemplary synthetic jet muffler 200 according the aspects of the disclosed embodiment.

The synthetic jet muffler 200 may include an exit end 210 and at least two propagation paths for conducting sound waves generated by a synthetic jet generator 225. The synthetic jet muffler may also include at least one aperture 260, corresponding to one or more apertures 265 of the synthetic jet generator 225. A first propagation path 215 may be provided for conducting a first sound wave 220, emitted by the synthetic jet 225 to the exit end 210. The first sound wave 220 may be generated by the action of a first piston 230 of the synthetic jet 225 driven by an actuator 235. The synthetic jet muffler may also include a shroud 240 for effecting a second propagation path 270 for conducting a second sound wave 245 emitted by the synthetic jet generator 225 in a direction opposite to the first sound wave 220. The second sound wave 245 may be generated by the action of a second piston 250 of the synthetic jet generator 225 driven by an actuator 255 and the shroud 240 may be arranged to conduct the second sound wave 245 to the exit end 210.

In at least one exemplary aspect, the shroud 240 may include at least two structures 275, 280 forming a generally annular configuration. The structures may be arranged as a first cylinder 280 surrounded by a second cylinder 275, both having an opening in a common plane 285 forming the exit end 210 of the synthetic jet muffler 200. The first cylinder 280 may enclose the synthetic jet generator 225 and have an additional open end 288, where the open ends of the first cylinder effect opposing propagation paths for the first and second sound waves 220, 245. The first cylinder 280 may also include an opening 290 to allow fluid to flow through aperture 265 to produce the synthetic jet. The second cylinder 275 may include a closed end 292 utilized to provide the second propagation path 270 to the exit end 210 for the second sound wave 245. The second cylinder 275 may include the aperture 260, corresponding to one or more apertures 265 of the synthetic jet generator 225. While the structures 275, 280 are described as cylinders and as a first cylinder surrounded by a second cylinder, it should be understood that the disclosed embodiment may include any other structures arranged in any other configurations so long as the noise cancelling effects via phase shift and direction matching of sound waves from the synthetic jet are achieved. FIGS. 3A and 3B show a cross sectional and an isometric view, respectively, of aspects of an exemplary synthetic jet muffler.

The shroud 240 may be further arranged so that the distances traveled by the first and second sound waves 220, 245 are different and operate to effect noise cancellation at the exit end 210. In at least one aspect, because the actuators and pistons operate at a substantially fixed frequency, the shroud may provide a difference in distances travelled by the first and second sound waves 220, 245 that effects a phase difference between the first and second sound waves 220, 245 substantially cancelling the first and second sound waves at the exit end 210 of the synthetic jet muffler. According to another aspect, the shroud may be arranged to provide a difference in distances travelled by the first and second sound waves that may correspond to $n*\lambda/2$ where n is an odd integer and $\lambda$ is a wavelength of the substantially fixed frequency.

Figure 4:
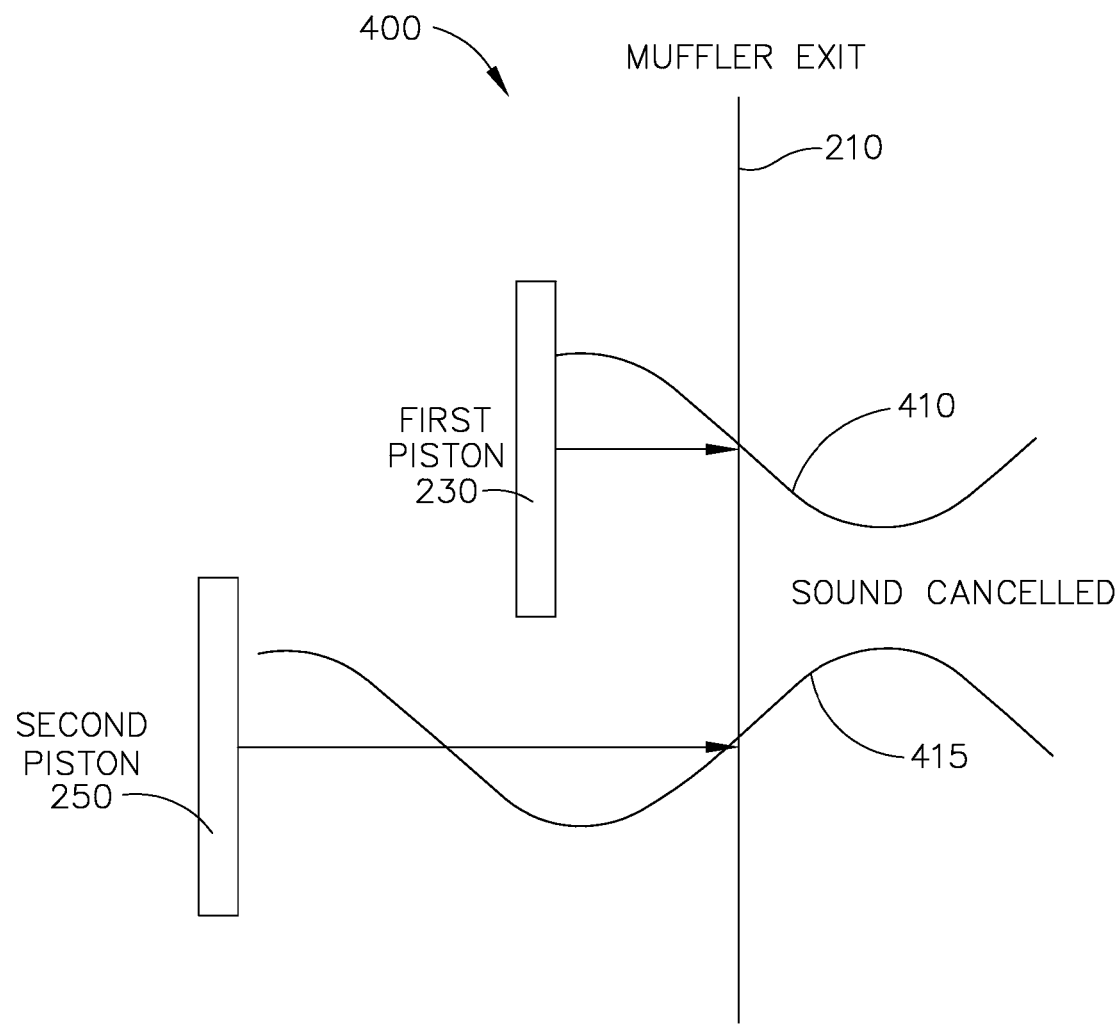
FIG. 4 shows an exemplary schematic of sound pressure along propagation paths of a synthetic jet muffler in accordance with aspects of the disclosed embodiment.

FIG. 4 shows an exemplary schematic diagram 400 of sound pressure along the propagation paths of the synthetic jet muffler 200. As a result of the difference in propagation paths, the sound pressure 410 generated by the first piston 230 is substantially out of phase with the sound pressure 415 generated by the second piston 250. When the sound pressure waves 410, 415 reach the exit 210 of the synthetic jet muffler, sound produced by the sound pressure waves is substantially cancelled.

Figure 5:
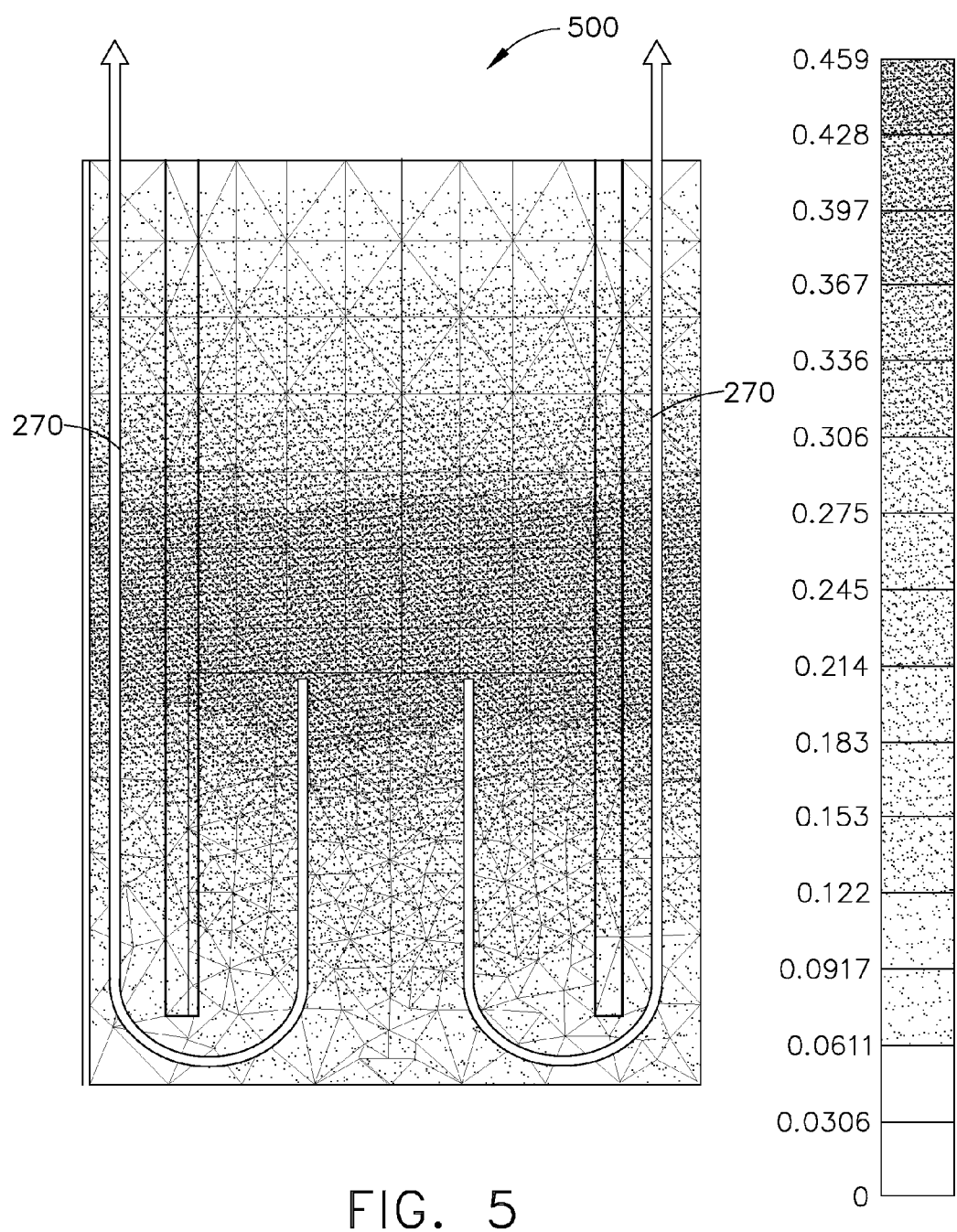
FIG. 5 shows an exemplary model of a synthetic jet muffler in accordance with aspects of the disclosed embodiment.

A model 500 of the synthetic jet muffler 200 using finite element analysis is shown in FIG. 5. The model 400 shows a cross section of the results of modeling the propagation path 270 of the second sound wave 255, and shows the pressure distribution of the acoustic mode resulting from the geometry of the synthetic jet muffler at or near a drive frequency of the exemplary synthetic jet generator 225.

The aspects of the disclosed embodiment may provide effective noise cancellation over a range of frequencies, however, as the frequency of operation of the synthetic jet generator increases, diffraction effects of the sound waves may impact the amount of cancellation achieved. At relatively low frequencies, the pistons operate as uniform radiators and diffraction effects of the sound waves may be negligible. However, at higher frequencies effective noise cancellation may require matching the directivity of sound sources resulting from sound waves 220, 245 as they pass the exit opening 210, in addition to providing a phase difference between the first and second sound waves 220. A mismatch of directivity at higher frequencies may cause incomplete cancellation of the sound field at off-axis locations, while cancellation may still be effective at the exit end of the synthetic jet muffler.

Figure 6:
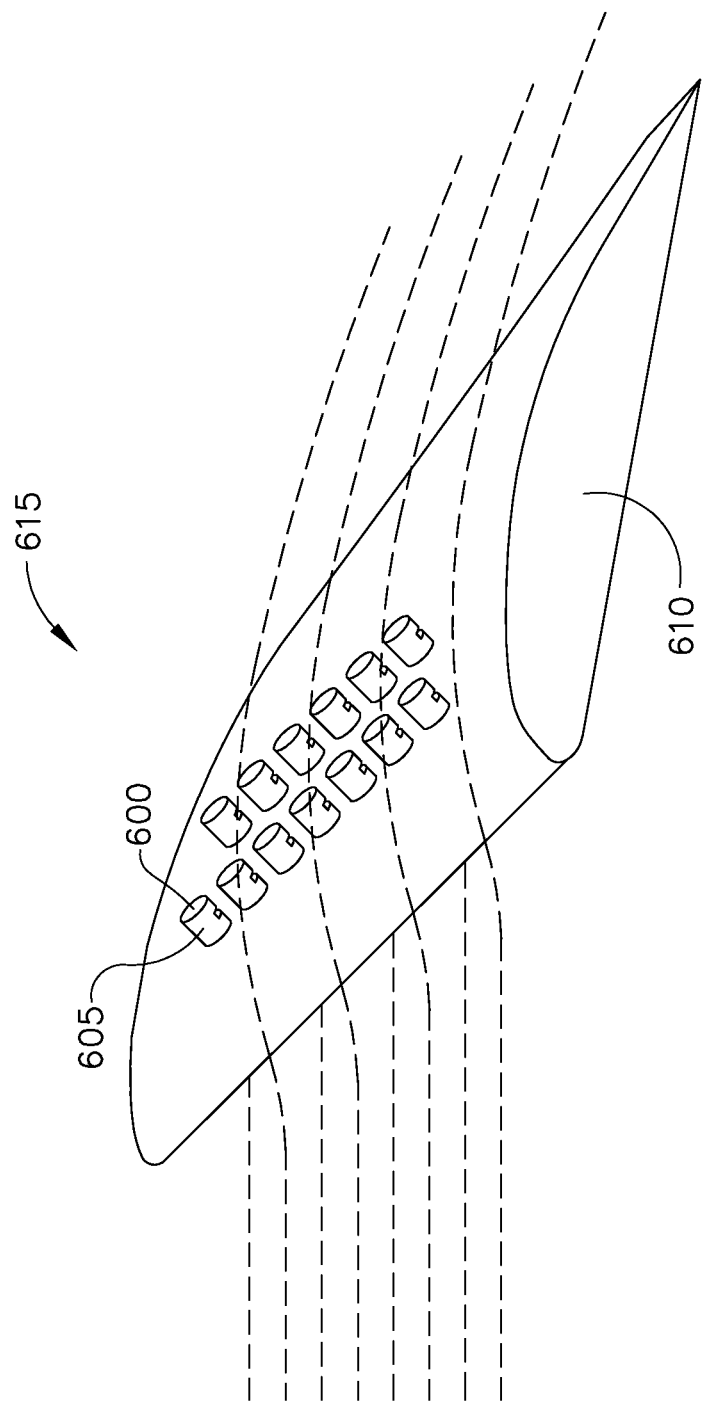
FIG. 6 shows a schematic diagram of an exemplary aspect where one or more synthetic jets with mufflers are used in combination with an airfoil in accordance with aspects of the disclosed embodiment.

FIG. 6 shows a schematic diagram of an exemplary aspect where one or more synthetic jets 600 with mufflers 605 according to the disclosed embodiment may be used in combination with an airfoil 610 to achieve active flow control. For example, the one or more synthetic jets 600 may be used to control flow separation by adding or subtracting energy from a fluid boundary layer 615. In particular, the one or more synthetic jets 600 may be used to decrease drag by suppressing flow separation or shedding in order to prevent leading edge stall at high angles of attack. An exemplary airfoil with synthetic jets is shown in U.S. Pat. No. 5,938,404, incorporated by reference in its entirety. As mentioned above, the synthetic jet 600 may produce high sound levels inside the airfoil due to the reciprocating, single frequency action of the pumping mechanism and the addition of the muffler 605 may at least operate to cancel this noise. It should be understood that the locations, arrangement and number of synthetic jets 600 and mufflers 605 in FIG. 6 are exemplary only and that any suitable configuration and quantity may be utilized. For example, the synthetic jets 600 and mufflers 605 may be mounted on a surface or embedded within the airfoil, and may be have any orientation so long as the noise is attenuated or cancelled.

In accordance with one or more aspects of the disclosed embodiment, a synthetic jet muffler includes an exit end, a propagation path for conducting a first sound wave emitted by a synthetic jet generator to the exit end, and a shroud for conducting a second sound wave emitted from the synthetic jet generator in a direction opposite to the first sound wave to the exit end, wherein the shroud is disposed so that the first and second sound waves travel different distances to effect noise cancellation at the exit end.

In accordance with one or more aspects of the disclosed embodiment, the difference in distances travelled by the first and second sound waves effect a phase difference between the first and second sound waves substantially cancelling the first and second sound waves at the exit end of the synthetic jet muffler.

In accordance with one or more aspects of the disclosed embodiment, the synthetic jet generator operates at a substantially fixed frequency.

In accordance with one or more aspects of the disclosed embodiment, the difference in distances travelled by the first and second sound waves corresponds to $n*\lambda/2$ where n is an odd integer and $\lambda$ is a wavelength of the substantially fixed frequency.

In accordance with one or more aspects of the disclosed embodiment, the synthetic jet generator comprises synchronized opposing synthetic jet actuators.

In accordance with one or more aspects of the disclosed embodiment, the synchronized opposing synthetic jet actuators comprise opposing pistons.

In accordance with one or more aspects of the disclosed embodiment, the shroud is positioned to surround the synthetic jet and comprises at least one aperture for conducting a flow generated by the synthetic jet.

In accordance with one or more aspects of the disclosed embodiment, an apparatus includes a synthetic jet having two or more actuators producing sound waves in different directions, and a shroud surrounding the synthetic jet, the shroud having an open end and a waveguide structure having propagation paths of different lengths for the sound waves to effect noise cancellation at the open end.

In accordance with one or more aspects of the disclosed embodiment, the difference in lengths of the propagation paths effect a phase difference between the sound waves substantially cancelling the sound waves at the open end.

In accordance with one or more aspects of the disclosed embodiment, the synthetic jet actuators operate at a substantially fixed frequency.

In accordance with one or more aspects of the disclosed embodiment, the difference in distances of the propagation paths corresponds to $n*\lambda/2$ where n is an odd integer and $\lambda$ is a wavelength of the substantially fixed frequency.

In accordance with one or more aspects of the disclosed embodiment, the two or more actuators operate synchronously in opposing directions.

In accordance with one or more aspects of the disclosed embodiment, the two or more actuators comprise opposing pistons.

In accordance with one or more aspects of the disclosed embodiment, the shroud comprises at least one aperture for conducting a flow generated by the synthetic jet.

In accordance with one or more aspects of the disclosed embodiment, a method of reducing noise produced by a synthetic jet includes operating the synthetic jet at a substantially fixed frequency to pump a fluid, and conducting sound waves produced in different directions by the synthetic jet through waveguides having different lengths relative to the substantially fixed frequency for effecting noise cancellation at a common exit plane of the waveguides.

In accordance with one or more aspects of the disclosed embodiment, the different waveguide lengths effect a phase difference between the sound waves substantially cancelling the sound waves at the common exit plane.

In accordance with one or more aspects of the disclosed embodiment, a difference in the waveguide lengths corresponds to $n*\lambda/2$ where n is an odd integer and $\lambda$ is a wavelength of the substantially fixed frequency.

In accordance with one or more aspects of the disclosed embodiment, the synthetic jet comprises two or more actuators operating synchronously in opposing directions.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. A synthetic jet muffler comprising:
an exit end;
a propagation path for conducting a first sound wave emitted by a synthetic jet generator to the exit end; and
a shroud for conducting a second sound wave emitted from the synthetic jet generator in a direction opposite to the first sound wave to the exit end, wherein the shroud is disposed so that the first and second sound waves travel different distances to effect noise cancellation at the exit end.

2. The synthetic jet muffler of claim 1, wherein the difference in distances travelled by the first and second sound waves effect a phase difference between the first and second sound waves substantially cancelling the first and second sound waves at the exit end of the synthetic jet muffler.

3. The synthetic jet muffler of claim 1, wherein the synthetic jet generator operates at a substantially fixed frequency.

4. The synthetic jet muffler of claim 3, wherein the difference in distances travelled by the first and second sound waves corresponds to $n*\lambda/2$ where n is an odd integer and $\lambda$ is a wavelength of the substantially fixed frequency.

5. The synthetic jet muffler of claim 1, wherein the synthetic jet generator comprises synchronized opposing synthetic jet actuators.

6. The synthetic jet muffler of claim 5, wherein the synchronized opposing synthetic jet actuators comprise opposing pistons.

7. The synthetic jet muffler of claim 1, wherein the shroud is positioned to surround the synthetic jet and comprises at least one aperture for conducting a flow generated by the synthetic jet.

8. An apparatus comprising:
a synthetic jet comprising two or more actuators producing sound waves in different directions; and
a shroud surrounding the synthetic jet, the shroud having an open end and a waveguide structure having propagation paths of different lengths for the sound waves to effect noise cancellation at the open end.

9. The apparatus claim 8, wherein the difference in lengths of the propagation paths effect a phase difference between the sound waves substantially cancelling the sound waves at the open end.

10. The apparatus of claim 8, wherein the synthetic jet actuators operate at a substantially fixed frequency.

11. The apparatus of claim 10, wherein the difference in distances of the propagation paths corresponds to $n*\lambda/2$ where n is an odd integer and $\lambda$ is a wavelength of the substantially fixed frequency.

12. The apparatus of claim 8, wherein the two or more actuators operate synchronously in opposing directions.

13. The apparatus of claim 12, wherein the two or more actuators comprise opposing pistons.

14. The apparatus of claim 8, wherein the shroud comprises at least one aperture for conducting a flow generated by the synthetic jet.

15. A method of reducing noise produced by a synthetic jet comprising:
operating the synthetic jet at a substantially fixed frequency to pump a fluid;
conducting sound waves produced in different directions by the synthetic jet through waveguides having different lengths relative to the substantially fixed frequency for effecting noise cancellation at a common exit plane of the waveguides.

16. The method of claim 15, wherein the different waveguide lengths effect a phase difference between the sound waves substantially cancelling the sound waves at the common exit plane.

17. The method of claim 15, wherein a difference in the waveguide lengths corresponds to $n*\lambda/2$ where n is an odd integer and $\lambda$ is a wavelength of the substantially fixed frequency.

18. The method of claim 15, wherein the synthetic jet comprises two or more actuators operating synchronously in opposing directions.

* * * * *